(12) United States Patent
Chiang

(10) Patent No.: US 8,274,595 B2
(45) Date of Patent: Sep. 25, 2012

(54) OPTICAL ZOOM CAMERA MODULE

(75) Inventor: Shun-Fan Chiang, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 408 days.

(21) Appl. No.: 12/702,450

(22) Filed: Feb. 9, 2010

(65) Prior Publication Data
US 2011/0007202 A1 Jan. 13, 2011

(30) Foreign Application Priority Data
Jul. 10, 2009 (CN) .......................... 2009 1 0304222

(51) Int. Cl.
*H04N 5/225* (2006.01)
(52) U.S. Cl. ...................................... 348/340; 348/374
(58) Field of Classification Search .................. 348/340, 348/374
See application file for complete search history.

(56) References Cited

U.S. PATENT DOCUMENTS
5,892,989 A * 4/1999 Kawasaki et al. ............... 396/87
* cited by examiner

*Primary Examiner* — Albert Cutler
(74) *Attorney, Agent, or Firm* — Altis Law Group, Inc.

(57) ABSTRACT

A camera module includes a circuit board, an image sensor mounted on the circuit board, and a first lens module and a second lens module aligned with the image sensor. The first lens module includes a fixing member, a first barrel rotatably supported by the fixing member, a second barrel movably received in the first barrel and receiving a first lens therein, a driving apparatus configured for driving the first barrel to rotate, and a fixed leaning member arranged outside of the first barrel. The first barrel has a cam groove formed along a circumference thereof, and the second barrel has a guiding bar extending through the cam groove and leaned against the leaning member, such that when the driving apparatus drives the first barrel to rotate, the second barrel is driven to move along an optical axis of the first lens relative to the second lens module and the image sensor.

17 Claims, 5 Drawing Sheets

OPTICAL ZOOM CAMERA MODULE

BACKGROUND

1. Technical Field

The present disclosure relates to camera modules, and particularly, to a camera module with a zoom function.

2. Description of Related Art

A typical zoom camera includes a plurality of lenses therein. At least one lens is movable along an optical axis thereof, thus achieving a zooming function. However, the lens is easily diverted from the optical axis during movement, thus resulting in blurred images.

However, there is room for improvement.

BRIEF DESCRIPTION OF THE DRAWINGS

Many aspects of the present camera module can be better understood with reference to the following drawings. The components in the drawings are not necessarily drawn to scale, the emphasis instead being placed upon clearly illustrating the principles of the present camera module. Moreover, in the drawings, like reference numerals designate corresponding parts throughout the several views.

DETAILED DESCRIPTION

Figure 1:
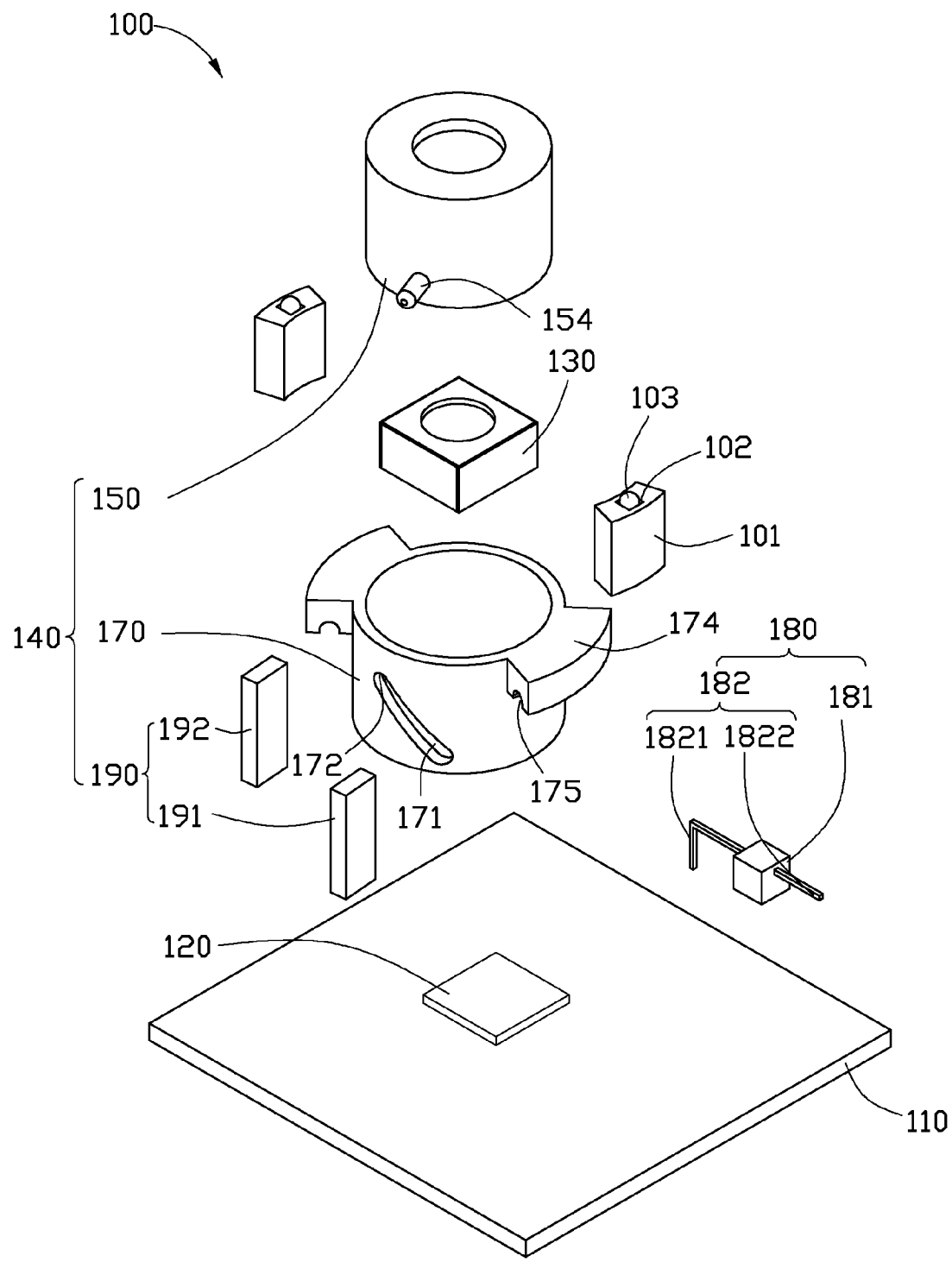
FIG. 1 is an exposed view of a camera module in accordance with a first embodiment.
Figure 2:
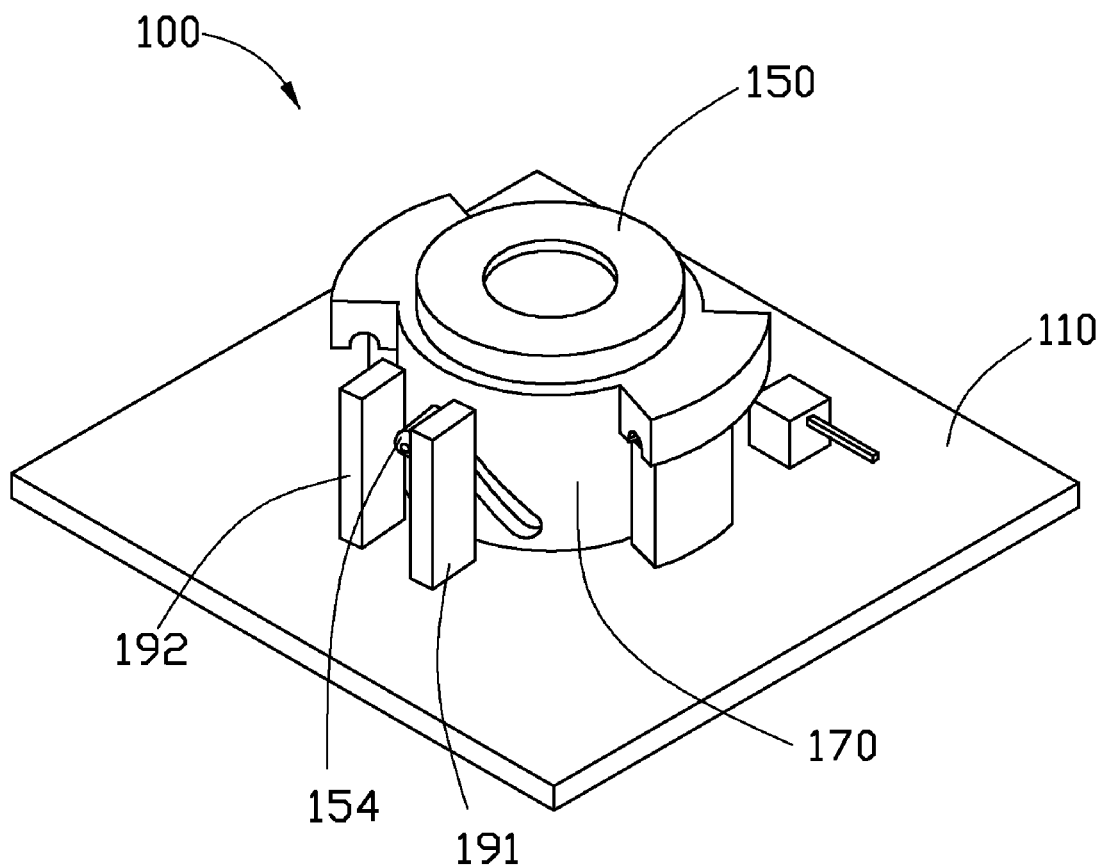
FIG. 2 is an assembled view of the camera module shown in FIG. 1.
Figure 3:
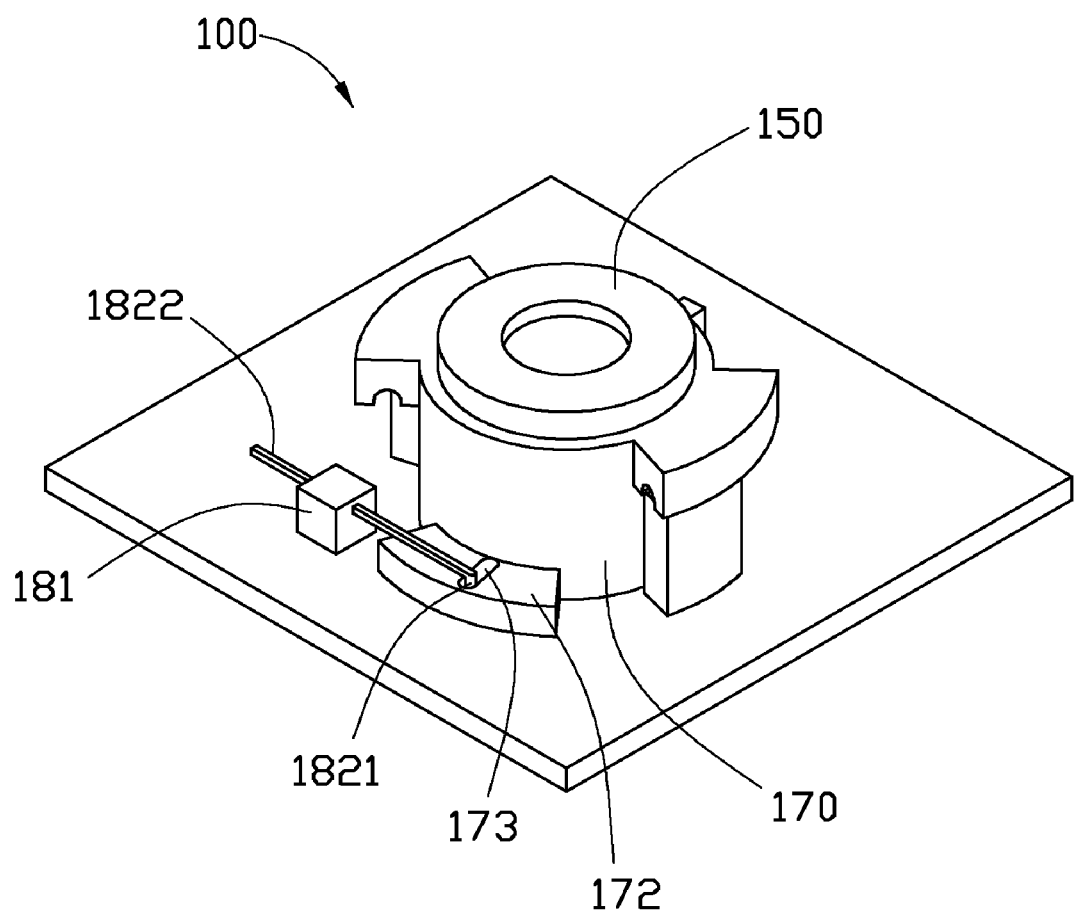
FIG. 3 is similar to FIG. 2, but showing the camera module rotated 180 degrees.
Figure 4:
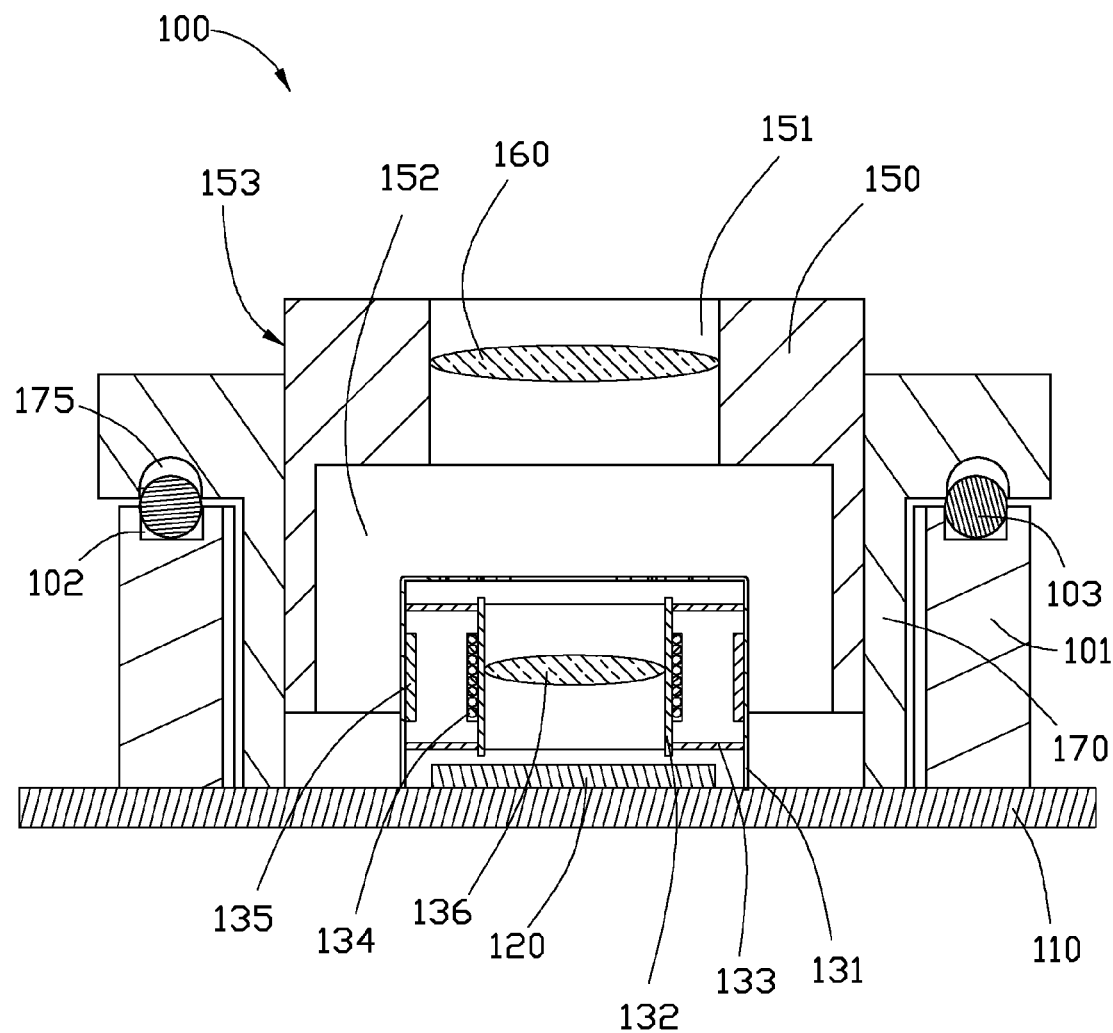
FIG. 4 is a cross sectional view of the camera module shown in FIG. 3.

Embodiments of the present camera module will now be described in detail below and with reference to the drawings.

Referring to FIGS. 1 to 4, a camera module 100 in accordance with a first embodiment is provided. The camera module 100 includes a circuit board 110, an image sensor 120 mounted on the circuit board 110, and a first lens module 140 and a second lens module 130 aligned with the image sensor 120.

The first lens module 140 includes a first barrel 170, a second barrel 150, a first lens 160 fixed in the second barrel 150, a driving apparatus 180 configured for driving the first barrel 170 to rotate, a leaning member 190 fixed on the circuit board 110, and a fixing member including two arc-shaped posts 101 fixed on the circuit board 110.

The first barrel 170 has a cam groove 171 formed along a circumference thereof, and has two arc-shaped lugs 174 formed thereon. In the present embodiment, the lugs 174 extend from two ends of a diameter of the first barrel 170 at a top end of the first barrel 170. Bottom surfaces of the lugs 174 each have a guiding groove 175 formed therein. The posts 101 are opposite each other, with imaginary centers thereof aligned with each other. Top surfaces of the posts 101 each have a recess 102 formed therein, for respectively receiving a ball bearing 103 therein. The first barrel 170 is disposed on the circuit board 110, with the lugs 174 respectively facing the respective posts 101, and part of the ball bearings 103 slidably received in the guiding grooves 175. Thus, the first barrel 170 is rotatably supported by the posts 101.

The second barrel 150 has a guiding bar 154 formed on an outer surface 153 thereof, and a first inner space 151 defined at a first end thereof, and a second inner space 152 defined at a second end thereof. The second inner space 152 is greater than the first inner space 151. The first inner space 151 receives the first lens 160 therein, and the second inner space 152 receives the second lens module 130 therein. The leaning member 190 includes a first plate 191 and a second plate 192 opposite each other outside of the first barrel 170. A height of each of the first plate 191 and second plate 192 relative to the circuit board 110 is greater than a height of a distal end 172 of the cam groove 171 relative to the circuit board 110. The second barrel 150 and the first barrel 170 are coaxially arranged, and the second barrel 150 is movably received in the first barrel 170, with the outer surface 153 thereof in contact with an inner surface of the first barrel 170, and the guiding bar 154 extending through the cam groove 171 and leaning against one of the first and second plates 191, 192.

The driving apparatus 180 includes a stepping motor 181 and a driving rod 182. The driving rod 182 is substantially "⌐" shaped, and includes a bent end 1821 and a straight end 1822. A connecting block 172 is attached to the first barrel 170. The connecting block 172 can be integrally formed with the first barrel 170, or separately provided and then fixed on the first barrel 170. The connecting block 172 has a groove 173 formed therein, with a central axis of the groove 173 perpendicular to a central axis of the first barrel 170. The bent end 1821 is inserted in the grove 173, and the straight end 1822 extends through the stepping motor 181.

In the present embodiment, the stepping motor 181 is fixed on the circuit board 110, and when the stepping motor 181 drives the driving rod 182, the straight end 1822 moves along a straight line through the stepping motor 181 (i.e., a length of the portion of the driving rod 182 between the stepping motor 181 and the bent end 1821 is increased or decreased). In particular, when the stepping motor 181 drives the straight end 1822 to move along a straight line in a direction thereof, and the bent end 1821 is driven to move along the groove 173 in a direction thereof, and thus the first barrel 170 is rotated in a clockwise or counterclockwise direction. In particular, when the bent end 1821 is moved to an end of the groove 173, the stepping motor 181 can drive the straight end 1822 to move along the straight line in an opposite direction thereof, such that the bent end 1821 can be driven to move along the groove 173 in an opposite direction thereof, and the first barrel 170 can be rotated in an opposite direction.

When the first barrel 170 is initiated to be rotated in a direction, a surface of one of the first and second plates 191, 192 applies a blocking force on the guiding bar 154, i.e., the guiding bar 154 leans against one of the first and second plates 191, 192; and when the first barrel 170 is rotated in an opposite direction, the guiding bar 154 leans against the other one of the first and second plates 191, 192, such that while the first barrel 170 is rotated, the second barrel 150 is driven to move backwards or forwards relative to the first barrel 170 along a central axis thereof (i.e., along an optical axis of the first lens 160). Due to the cooperation of the cam groove 171, the guiding bar 154 and the first and second plates 191, 192, deviation of the second barrel 150 during the movement can be avoided.

The second lens module 130 includes a fixing barrel 131 fixed on the circuit board 110, a movable barrel 132 received in the fixing barrel 131, a plurality of elastic members 133 interconnecting the fixing barrel 131 and the movable barrel 132, a second lens 136 fixed in the movable barrel 132, a first magnetic member 135 and a second magnetic member 134. In the present embodiment, the fixing barrel 131 and the movable barrel 132 are coaxially aligned with the first and second barrels 170, 150. The first magnetic member 135 is fixed on an inner wall of the fixing barrel 131, and the second magnetic member 134 is fixed on an outer wall of the movable barrel 132. The first magnetic member 135 and the second magnetic member 134 are arranged for cooperatively generating a magnetic field for driving the movable barrel 132 together with the second lens 136 to move in the fixing barrel 131 along an optical axis of the second lens 136.

According to the present camera module 100, the first and second lenses 160, 136 are respectively driven to move. The camera module 100 has the autofocus function and the zooming function.

Figure 5:
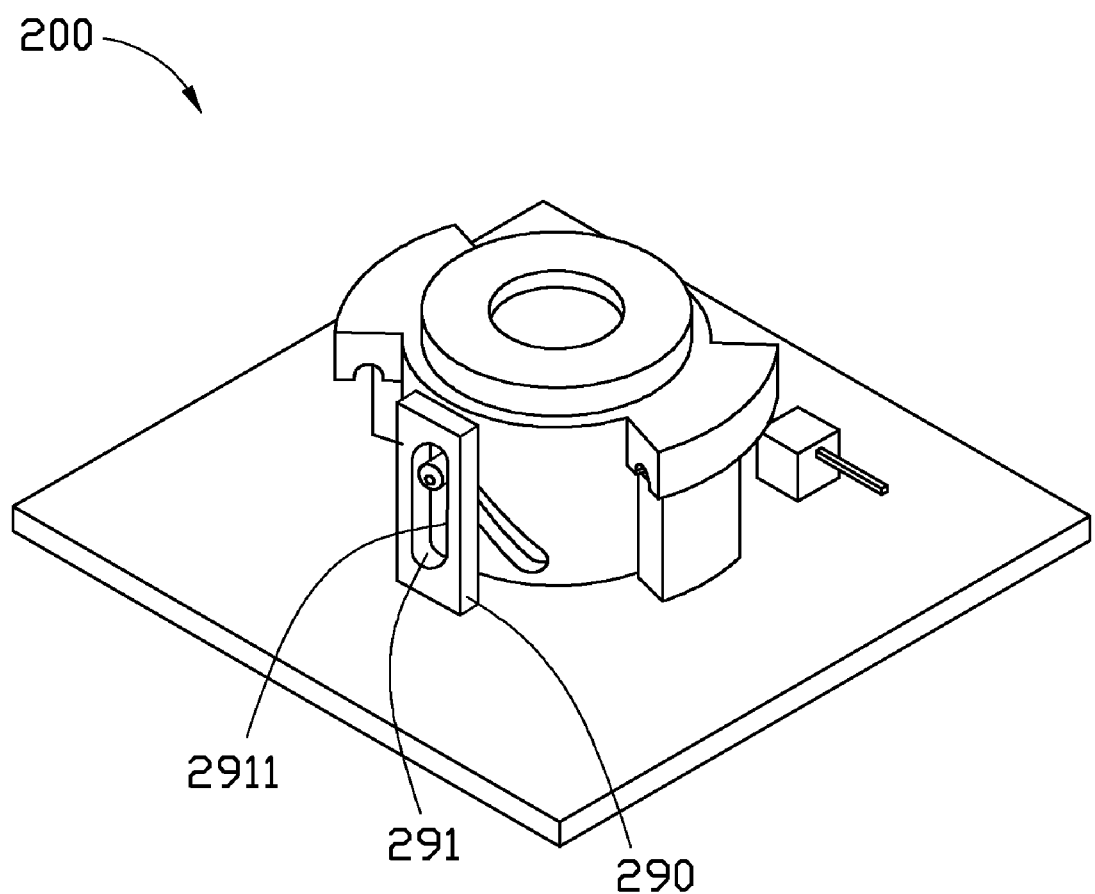
FIG. 5 is perspective view of a camera module in accordance with a second embodiment.

Referring to FIG. 5, a camera module 200 in accordance with a second embodiment, is provided. The camera module 200 is similar to first camera module 100 illustrated above, however, a leaning member 290 including a single plate is used. The plate has a through hole 291 formed therein. Two opposite inner side surfaces 2911 of the through hole 291 are configured as leaning portions for the guiding bar.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A camera module, comprising:
a circuit board;
an image sensor mounted on the circuit board; and
a first lens module and a second lens module aligned with the image sensor,
wherein the first lens module comprises a first barrel disposed on the circuit board, a second barrel movably received in the first barrel, a first lens received in the second barrel, a driving apparatus configured for driving the first barrel to rotate, and a leaning member fixed on the circuit board and arranged outside of the first barrel, the first barrel has a cam groove formed along a circumference thereof, and the second barrel has a guiding bar extending through the cam groove and leaned against the leaning member, such that when the driving apparatus drives the first barrel to rotate, the second barrel together with the first lens is driven to move along an optical axis of the first lens; and
wherein the second lens module comprises a fixing barrel fixed on the circuit board, a movable barrel received in the fixing barrel, a plurality of elastic members interconnecting the fixing barrel and the movable barrel, a second lens received in the movable barrel, a first magnetic member fixed on an inner wall of the fixing barrel, and a second magnetic member fixed on an outer wall of the movable barrel, and the first magnetic member and the second magnetic member are arranged for cooperatively generating a magnetic field for driving the movable barrel together with second lens to move along an optical axis of the second lens.

2. The camera module as described in claim 1, wherein the leaning member comprises a first plate and a second plate opposite the first plate, and the guiding bar leans against the first plate or the second plate.

3. The camera module as described in claim 2, wherein a height of each of the first plate and the second plate relative to the circuit board is greater than a height of a distal end of the cam groove relative to the circuit board.

4. The camera module as described in claim 1, wherein the leaning member comprises a plate having a through hole formed therein, and the guiding bar extends through the through hole and leans against an inner surface of the through hole.

5. The camera module as described in claim 1, wherein the first barrel, the second barrel, the fixing barrel and the movable barrel are coaxially arranged.

6. The camera module as described in claim 1, wherein the driving apparatus comprises a stepping motor and a driving rod, the first barrel has a connecting block, the connecting block has a groove formed therein, with a central axis of the groove perpendicular to a central axis of the first barrel, the driving rod has a bent end inserted in the groove and a straight end driven by the stepping motor, the stepping motor is configured for driving the straight end to move along a straight line, and the bent end is driven to move along the groove while the first barrel is rotated.

7. The camera module as described in claim 1, further comprising a first arc-shaped post and a second arc-shaped post opposite each other, a center of the first arc-shaped post being aligned with a center of the second arc-shaped post; the first barrel comprising a first arc-shaped lug and a second arc-shaped lug formed thereon, and the first and second arc-shaped lugs being rotatably supported by the first and second arc-shaped posts, respectively.

8. The camera module as described in claim 7, wherein end surfaces of the first and second arc-shaped posts facing the respective first and second arc-shaped lugs each have a recess formed therein, for respectively receiving a ball bearing, end surfaces of the first and second arc-shaped lugs facing the respective first and second arc-shaped posts each have a guiding groove formed therein, and part of the ball bearings are slidably received in the guiding grooves.

9. A camera module, comprising:
a circuit board;
an image sensor mounted on the circuit board; and
a first lens module and a second lens module aligned with the image sensor,
wherein the first lens module comprises a fixing member, a first barrel rotatably supported by the fixing member, a second barrel movably received in the first barrel, a first lens received in the second barrel, a driving apparatus configured for driving the first barrel to rotate, and a fixed leaning member arranged outside of the first barrel, the first barrel has a cam groove formed along a circumference thereof, and the second barrel has a guiding bar extending through the cam groove and leaned against the leaning member, such that when the driving apparatus drives the first barrel to rotate, the second barrel together with the first lens is driven to move along an optical axis of the first lens relative to the second lens module and the image sensor; and
wherein the fixing member comprises a first arc-shaped post and a second arc-shaped post arranged concentrically and opposite each other, the first barrel comprises a first arc-shaped lug and a second arc-shaped lug formed thereon, the first and second arc-shaped posts each have a recess formed on a top end surface thereof, for respectively receiving a ball bearing, the first and second arc-shaped lugs each have a guiding groove formed on a bottom end surface thereof, and part of the ball bearings are slidably received in the respective guiding grooves, such that the first barrel is rotatably supported by the fixing member.

10. The camera module as described in claim 9, wherein the driving apparatus comprises a stepping motor and a driving rod, the first barrel has a connecting block attached thereon, the connecting block has a groove formed therein, with a central axis of the groove perpendicular to a central axis of the first barrel, the driving rod has a bent end inserted in the groove and a straight end driven by the stepping motor, the stepping motor is configured to drive the straight end to move along a central line of the straight end, and the bent end is driven to move along the groove while the first barrel is rotated.

11. The camera module as described in claim 9, wherein the leaning member comprises two surfaces, and the guiding bar is leaned against one of the surfaces when the first barrel is initiated to be rotated, and a height of each of the surfaces relative to the circuit board is greater than a height of a distal end of the cam groove relative to the circuit board.

12. The camera module as described in claim 9, wherein the second lens module comprises a fixing barrel fixed on the circuit board, a movable barrel received in the fixing barrel, a plurality of elastic members interconnecting the fixing barrel and the movable barrel, a second lens received in the movable barrel, a first magnetic member fixed on an inner wall of the fixing barrel, and a second magnetic member fixed on an outer wall of the movable barrel, and the first magnetic member and the second magnetic member are arranged for cooperatively generating a magnetic field for driving the movable barrel together with the second lens to move along an optical axis of the second lens.

13. A camera module, comprising:
a circuit board;
an image sensor mounted on the circuit board; and
a first lens module and a second lens module aligned with the image sensor,
wherein the first lens module comprises a fixing member, a first barrel rotatably supported by the fixing member, a second barrel movably received in the first barrel, a first lens received in the second barrel, a driving apparatus configured for driving the first barrel to rotate, and a leaning member fixed on the circuit board and arranged outside of the first barrel, the first barrel has a cam groove formed along a circumference thereof, and the second barrel has a guiding bar extending through the cam groove and leaned against the leaning member, such that when the driving apparatus drives the first barrel to rotate, the second barrel together with the first lens is driven to move along an optical axis of the first lens relative to the second lens module and the image sensor;
wherein the fixing member comprises a first arc-shaped post and a second arc-shaped post arranged concentrically and opposite each other, the first barrel comprises a first arc-shaped lug and a second arc-shaped lug formed thereon, the first and second arc-shaped posts each have a recess formed on a top end surface thereof, for respectively receiving a ball bearing, the first and second arc-shaped lugs each have a guiding groove formed on a bottom end surface thereof, and part of the ball bearings are slidably received in the respective guiding grooves, such that the first barrel is rotatably supported by the fixing member; and
wherein the leaning member comprises a first surface and a second surface opposite to the first surface, when the first barrel is initiated to be rotated in a first direction, the first surface applies a blocking force on the guiding bar, such that the second barrel together with the first lens is driven to move in a third direction along the optical axis of the first lens; and when the first barrel is initiated to be rotated in a second direction, the second surface applies a blocking force on the guiding bar, such that the second barrel together with the first lens is driven to move in a fourth direction opposite to the third direction along the optical axis of the first lens.

14. The camera module as described in claim 13, wherein each of the first surface and second surface is provided on a plate, and the two plates are arranged opposite to each other.

15. The camera module as described in claim 13, wherein the first surface and the second surface are provided in a through hole of a plate of the leaning member.

16. The camera module as described in claim 13, wherein the driving apparatus comprises a stepping motor and a driving rod, the first barrel has a connecting block attached thereon, the connecting block has a groove formed therein, with a central axis of the groove perpendicular to a central axis of the first barrel, the driving rod has a bent end inserted in the groove and a straight end driven by the stepping motor, the stepping motor is configured to drive the straight end to move along a central line of the straight end, and the bent end is driven to move along the groove while the first barrel is rotated.

17. The camera module as described in claim 13, wherein the second lens module comprises a fixing barrel fixed on the circuit board, a movable barrel received in the fixing barrel, a plurality of elastic members interconnecting the fixing barrel and the movable barrel, a second lens received in the movable barrel, a first magnetic member fixed on an inner wall of the fixing barrel, and a second magnetic member fixed on an outer wall of the movable barrel, and the first magnetic member and the second magnetic member are arranged for cooperatively generating a magnetic field for driving the movable barrel together with second lens to move along an optical axis of the second lens.

* * * * *